(12) United States Patent
Nagasawa

(10) Patent No.: US 12,151,630 B2
(45) Date of Patent: Nov. 26, 2024

(54) AIRBAG APPARATUS

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 350 days.

(21) Appl. No.: 17/691,673

(22) Filed: Mar. 10, 2022

(65) Prior Publication Data

US 2022/0306024 A1    Sep. 29, 2022

(30) Foreign Application Priority Data

Mar. 29, 2021    (JP) .................................. 2021-054745

(51) Int. Cl.
   *B60R 19/20*    (2006.01)
   *B60R 21/0134*    (2006.01)
   (Continued)

(52) U.S. Cl.
   CPC ........ *B60R 19/205* (2013.01); *B60R 21/0134* (2013.01); *B60R 21/2338* (2013.01);
   (Continued)

(58) Field of Classification Search
   CPC . B60R 19/205; B60R 19/483; B60R 21/0134; B60R 21/34; B60R 21/2338;
   (Continued)

(56) References Cited

U.S. PATENT DOCUMENTS 10,471,927 B1 * 11/2019 Gupta .................... B60R 21/36
11,608,025 B2 * 3/2023 Cord ..................... B60R 21/207
(Continued)

FOREIGN PATENT DOCUMENTS

DE    10121630 A1 * 11/2002 ........... B60R 19/205
DE    10213116 A1 *  1/2003 ............. B60R 21/36
(Continued)

OTHER PUBLICATIONS

Rach (DE 10356572 A1), machine translation (Year: 2005).*
Haruhisa (JP 2001322518 A), machine translation (Year: 2001).*

*Primary Examiner* — Amy R Weisberg
*Assistant Examiner* — Wenwei Zhuo
(74) *Attorney, Agent, or Firm* — MCGINN I.P. LAW GROUP, PLLC

(57) ABSTRACT

An airbag apparatus to be applied to a vehicle includes an airbag, a collision determiner, an airbag deployment controller, and a pulling device. The airbag is configured to be deployed forward of a vehicle body front of the vehicle. The collision determiner is configured to establish a pre-crash determination in a case where a collision probability is equal to or higher than a predetermined threshold. The airbag deployment controller is configured to give to an inflator a command to supply deployment gas to the airbag and deploy the airbag, in response to the pre-crash determination. The pulling device is configured to pull, rearward of the vehicle, a collision portion with which a collision object is to collide or vicinity of the collision portion on a front surface of the airbag so as to form a recessed portion configured to restrain the collision object.

17 Claims, 6 Drawing Sheets

(51) Int. Cl.
*B60R 21/2338* (2011.01)
*B60R 21/36* (2011.01)
*B60R 21/00* (2006.01)
*B60R 21/01* (2006.01)

(52) U.S. Cl.
CPC ...... *B60R 21/36* (2013.01); *B60R 2021/0004* (2013.01); *B60R 2021/01013* (2013.01)

(58) Field of Classification Search
CPC .................. B60R 21/36; B60R 21/346; B60R 2021/23384; B60R 2021/2338; B60R 2021/01013; B60R 2021/0004
USPC ............. 293/134, 118, 15, 16, 107; 180/274
See application file for complete search history.

(56) References Cited

U.S. PATENT DOCUMENTS

| | | | | |
|---|---|---|---|---|
| 11,654,849 | B2* | 5/2023 | Nagasawa | B60R 21/0134 180/271 |
| 2006/0091661 | A1* | 5/2006 | Takimoto | B60R 21/36 280/742 |
| 2006/0186656 | A1* | 8/2006 | Kumagai | B60R 21/231 280/743.1 |
| 2015/0175121 | A1* | 6/2015 | Choi | B60R 21/36 180/274 |
| 2020/0198570 | A1* | 6/2020 | Raikar | B60R 21/2338 |
| 2022/0306023 | A1* | 9/2022 | Nagasawa | B60R 21/2338 |
| 2023/0249642 | A1* | 8/2023 | Hanawa | B60R 21/36 180/274 |

FOREIGN PATENT DOCUMENTS

| | | | | |
|---|---|---|---|---|
| DE | 10213178 A1 | * | 2/2003 | ............. B60R 21/36 |
| DE | 10356572 A1 | * | 6/2005 | ............. B60R 21/36 |
| JP | 2001322518 A | * | 11/2001 | |
| JP | 2004-338554 A | | 12/2004 | |
| JP | 2020-062938 A | | 4/2020 | |
| WO | WO-2018173514 A1 | * | 9/2018 | |

* cited by examiner

AIRBAG APPARATUS

CROSS-REFERENCE TO RELATED APPLICATIONS

The present application claims priority from Japanese Patent Application No. 2021-054745 filed on Mar. 29, 2021, the entire contents of which are hereby incorporated by reference.

BACKGROUND

The disclosure relates to an airbag apparatus including an airbag deployable outward from a vehicle body front of a vehicle such as an automobile.

Concerning a vehicle such as an automobile, it has been proposed to use an airbag deployable out of the vehicle so as to prevent damage to a pedestrian or the like during a collision.

As a technique regarding such an external airbag apparatus, Japanese Unexamined Patent Application Publication (JP-A) No. 2020-62938, for example, discloses that a pedestrian or the like is held and restrained by a group of airbags deployable respectively from a plurality of positions separated in a vehicle width direction.

JP-A No. 2001-322518 discloses a pedestrian protection airbag apparatus that restricts a shape of an airbag using straps (tethers) disposed inside the airbag so that the airbag does not excessively expand forward.

JP-A No. 2004-338554 discloses an airbag apparatus deployable and storable repeatedly in which a tether disposed inside an airbag is pulled when the airbag is stored.

SUMMARY

An aspect of the disclosure provides an airbag apparatus to be applied to a vehicle. The airbag apparatus includes an airbag, a collision determiner, an airbag deployment controller, and a pulling device. The airbag is configured to be deployed forward of a vehicle body front of the vehicle. The collision determiner is configured to establish a pre-crash determination in a case where a collision probability is equal to or higher than a predetermined threshold. The airbag deployment controller is configured to give to an inflator a command to supply deployment gas to the airbag and deploy the airbag, in response to the pre-crash determination. The pulling device is configured to pull, rearward of the vehicle, a collision portion with which a collision object is to collide or vicinity of the collision portion on a front surface of the airbag so as to form a recessed portion configured to restrain the collision object.

An aspect of the disclosure provides an airbag apparatus to be applied to a vehicle. The airbag apparatus includes an airbag, circuitry, and a pulling device. The airbag is configured to be deployed forward of a vehicle body front of the vehicle. The circuitry is configured to establish a pre-crash determination in a case where a collision probability is equal to or higher than a predetermined threshold. The circuitry is configured to give to an inflator a command to supply deployment gas to the airbag and deploy the airbag, upon establishing the pre-crash determination. The pulling device is configured to pull, rearward of the vehicle, a collision portion with which a collision object is to collide or vicinity of the collision portion on a front surface of the airbag so as to form a recessed portion configured to restrain the collision object.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

Concerning a collision of a vehicle with a pedestrian or a bicyclist (hereinafter referred to as a "pedestrian or the like"), there has been a demand for preventing injury to the pedestrian or the like.

It is desirable to provide an airbag apparatus that can prevent injury to a pedestrian or the like.

Hereinafter, a description will be made on an airbag apparatus according to an embodiment of the disclosure in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The airbag apparatus according to the embodiment is disposed, for example, on a front of a vehicle body of an automobile such as a passenger vehicle so as to mainly protect (reduce injuriousness to) a human body of a pedestrian, a bicyclist or the like with whom the automobile has collided.

Figure 1:
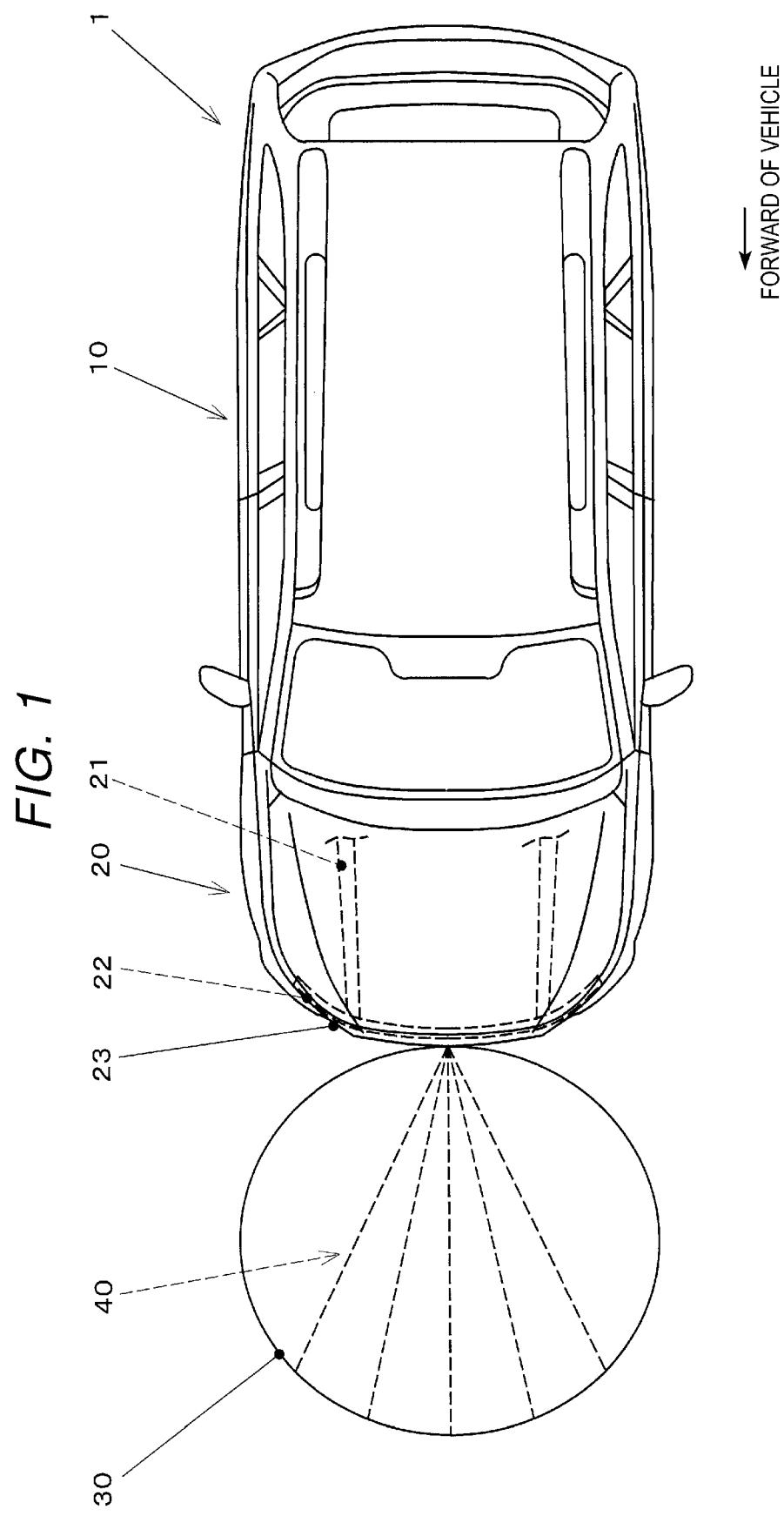
FIG. 1 is a diagram schematically illustrating a configuration of an airbag apparatus according to an embodiment of the disclosure.

FIG. 1 is a diagram schematically illustrating a configuration of the airbag apparatus according to the embodiment.

FIG. 1 illustrates a state of a vehicle including the airbag apparatus according to the embodiment, as viewed from above.

The vehicle 1 has, for example, a so-called two-box vehicle shape including an engine compartment 20 that protrudes forward from a vehicle cabin 10.

The vehicle cabin 10 has a space containing an occupant, for example.

The engine compartment 20 has a space containing power train components such as an engine, a transmission, a motor-generator in the case of an electric vehicle, and control units for these components.

The engine compartment 20 includes front side frames 21, a bumper beam 22, a front bumper 23, and other components.

The front side frames 21 are structural members protruding toward the front of the vehicle from a toeboard, not illustrated, which is a partition wall disposed on a front end of the vehicle cabin 10.

The front side frames 21 serve, for example, as cross members where a power train and a front suspension are attached, and as a base portion where a component such as a strut housing containing struts of a MacPherson-strut front suspension is attached.

For example, a steel plate is molded into components by presswork, and the components are gathered and welded into the front side frames 21. Thus, the front side frames 21 each have a closed rectangular cross-sectional shape as viewed from a vehicle fore-and-aft direction.

The bumper beam 22 is a structural member disposed on the vehicle body front and extending in a vehicle width direction.

For example, a steel plate is molded into components by presswork, and the components are gathered and welded into the bumper beam 22 or the bumper beam 22 is made of an extruded material of aluminum alloy. Thus, the bumper beam 22 is a beam-shape member of a closed cross-sectional shape.

An intermediate portion of the bumper beam 22 is coupled to front ends of the left and right front side frames 21.

Both ends of the bumper beam 22 in the vehicle width direction protrude outward in the vehicle width direction from the front side frames 21.

The bumper beam 22 is a load transmission member by which a load that an airbag 30, described later, receives from a human body or object collided with is transmitted to a rear side of the vehicle body via the front side frames 21.

The front bumper 23 is an exterior member disposed on a front end of the vehicle body, and includes a bumper face that is made of a material such as PP resin and that constitutes a skin. The bumper face is attached to the vehicle body with brackets, not illustrated, for example.

A front surface of the front bumper 23 is curved in such a manner that the vehicle front is convex when the vehicle 1 is viewed from above.

The bumper beam 22 has such an arcuate shape that the vehicle front is convex along a curve of the front surface of the front bumper 23 when the vehicle 1 is viewed from above.

The airbag apparatus according to the embodiment includes the airbag 30 described below.

The airbag 30 is formed in a bag shape by bonding panels of base cloth such as nylon 66 woven fabric.

When a pre-crash determination, described later, is established, deployment gas generated by an inflator 111 is introduced into the airbag 30, and the airbag 30 is deployed and further expanded.

The airbag 30 is deployed forward of the vehicle from a center portion of the front end of the vehicle body in the vehicle width direction.

In normal operation (before a pre-crash determination is established), the airbag 30 in a folded state is attached to the bumper beam 22 and contained inside the front bumper 23.

Upon a collision, the airbag 30 ruptures a fragile portion of the front bumper 23 and is unfolded forward of the vehicle and deployed forward of the front surface of the front bumper 23.

Figure 2:
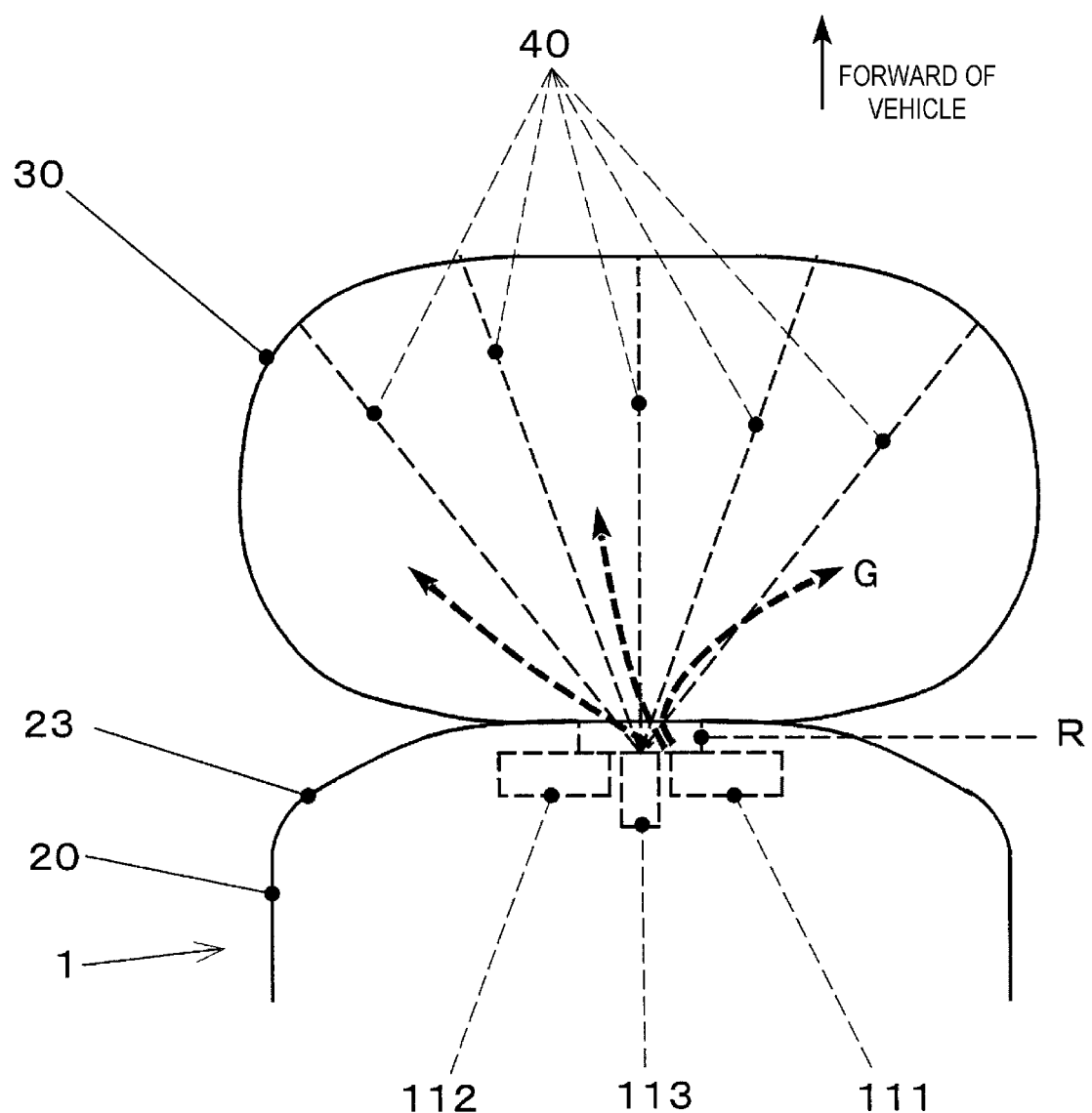
FIG. 2 is a schematic diagram illustrating a configuration of an airbag in the airbag apparatus according to the embodiment.

FIG. 2 is a schematic diagram illustrating a configuration of an airbag in the airbag apparatus according to the embodiment.

FIG. 2 illustrates a state of a front portion of the vehicle 1 as viewed from above (the same applies to FIGS. 5 and 6, described later).

Tethers 40 are disposed inside the airbag 30.

Upon a collision with a collision object such as a pedestrian, the collision object comes into contact with a front surface of the airbag 30, and the tethers 40 pull the front surface of the airbag 30 from the inside of the airbag 30 rearward of the vehicle so as to restrict a shape of the airbag 30 after deployed.

The tethers 40 are formed, for example, of base cloth panels in a belt shape with flexibility.

Front ends of the tethers 40 are coupled to an inner surface of the front surface of the airbag 30 by a method such as sewing and heat-sealing.

Rear ends of the tethers 40 are coupled to a tether pulling device 113, described later.

The tethers 40 are disposed on a front end of the airbag 30 and each distributed at each of a plurality of portions (five portions in an example illustrated in FIG. 2) in the vehicle width direction.

The rear ends of the tethers 40 are coupled to the single tether pulling device 113.

In the example illustrated in FIGS. 1 and 2, the tethers 40 extend forward of the vehicle and radially in the vehicle width direction.

Figure 3:
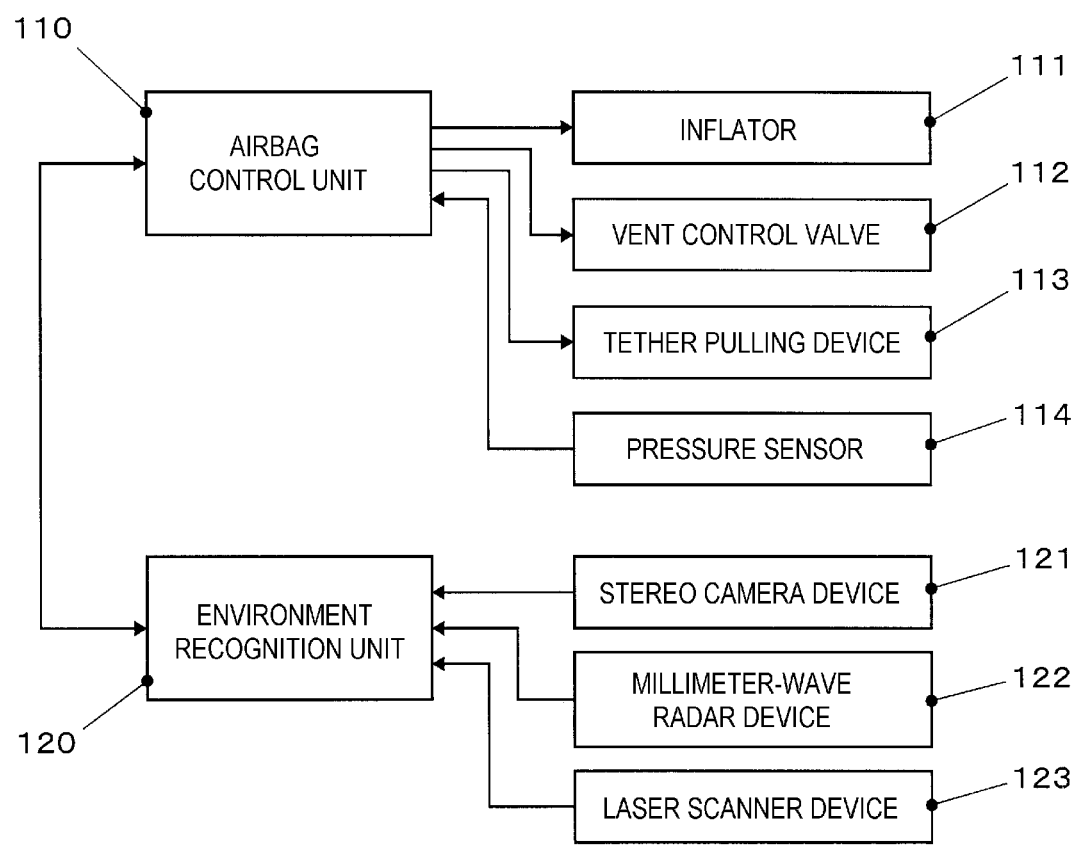
FIG. 3 is a block diagram schematically illustrating a configuration of a system to control the airbag apparatus according to the embodiment.

FIG. 3 is a block diagram schematically illustrating a configuration of a system to control the airbag apparatus according to the embodiment.

The system to control the airbag apparatus includes components such as an airbag control unit 110 and an environment recognition unit 120.

Each of these units may be provided as, for example, a microcomputer including an information processor such as a CPU, storages such as a RAM and a ROM, an input/output interface, and buses to couple these components to one another.

The units are connected via in-vehicle LAN such as a CAN communication system or directly and are mutually communicable.

The airbag control unit 110 commands and controls the inflator 111, a vent control valve 112, and the tether pulling device 113 so as to deploy the airbag 30 and also to control a deployment state.

In one embodiment, the airbag control unit 110 may serve as an "airbag deployment controller".

The inflator 111 is a chemical (explosive) gas generation device to generate deployment gas G to deploy the airbag 30 in response to a command from the airbag control unit 110.

The inflator 111 is a multistage inflator capable of generating the deployment gas G a plurality of times at time intervals.

In response to a command from the airbag control unit 110, the vent control valve 112 opens and closes a vent passage, not illustrated, to discharge the deployment gas G from the airbag 30 (e.g., release gas to the atmosphere).

The vent control valve 112 may include an electromagnetic valve, for example.

In response to a command from the airbag control unit 110, the tether pulling device 113 winds up the rear ends of the tethers 40 and causes the tethers 40 to pull the front surface of the airbag 30 rearward of the vehicle.

The tether pulling device 113 selectively pulls one or more (a group) of the plurality of tethers 40.

The tether pulling device 113 may include a chemical or electric actuator, for example.

The tether pulling device 113 pulls the front surface of the airbag 30 locally and forms a recessed portion C (see FIGS. 5 and 6) where the front surface is recessed rearward of the vehicle.

The airbag control unit 110 is provided with a pressure sensor 114.

The pressure sensor 114 detects a pressure of the deployment gas G inside (internal pressure) of the airbag 30.

Based on an output from the pressure sensor 114, the airbag control unit 110 can detect an input state of the load on the airbag 30.

The inflator 111, the vent control valve 112, the tether pulling device 113, and the pressure sensor 114 described above may be disposed, for example, on a retainer R, which is a container to contain the airbag 30 in a storage state.

The environment recognition unit 120 recognizes an environment around the host vehicle based on outputs from various sensors.

The environment recognition unit 120 recognizes, for example, human bodies of pedestrians, bicyclists, or the like, various objects such as other vehicles, buildings, trees, and geographical features, and road shapes (lane shapes) in the vicinity of the vehicle 1 (host vehicle).

When a collision with a human body of a pedestrian, a bicyclist, a motorcyclist, or the like, or with an object other than a human body, such as another vehicle, is unavoidable (when a collision probability is a predetermined value or higher), the environment recognition unit 120 establishes a pre-crash determination. In one embodiment, the environment recognition unit 120 may serve as a "collision determiner".

Components such as a stereo camera device 121, a millimeter-wave radar device 122, and a laser scanner device 123 are coupled to the environment recognition unit 120.

The stereo camera device 121 includes a pair of cameras disposed at a predetermined interval (base line length), and recognizes human bodies of pedestrians, bicyclists, or the like, and objects such as other vehicles and buildings. The stereo camera device 121 also detects a position of each of the human bodies, objects, or the like relative to the vehicle 1 using known stereo image processing.

The stereo camera device 121 recognizes attributes of a subject or object by, for example, pattern recognition of a captured image.

For example, in the case of a human body of a pedestrian or the like, the stereo camera device 121 recognizes attributes such as a build, presumed weight, and posture of the human body.

The millimeter-wave radar device 122 uses radio waves in a frequency band of 30 to 300 GHz, for example, and detects presence of a human body, an object, or the like, and positions of the human body, the object, or the like relative to the vehicle 1.

The laser scanner device (LiDAR) 123 irradiates and scans the vehicle 1 and its vicinity with a near-infrared laser beam in a pulse shape, for example. Based on presence of reflected light and time lags until the reflected light returns, the laser scanner device 123 detects presence of a human body, an object, or the like, positions of the human body, the object, or the like relative to the vehicle 1, and shapes of the human body, the object, or the like.

When a collision with a human body of a pedestrian or the like, or an object such as another vehicle is unavoidable (when a pre-crash determination is established), for example, the environment recognition unit 120 is capable of recognizing a collision form with the human body, the object, or the like (e.g., a speed vector of the other party of the collision with respect to the vehicle 1, and a collision position relative to the vehicle 1), and attributes of the other party of the collision (e.g., a build of the human body and a model of the other vehicle).

Next, an operation of the airbag apparatus according to the embodiment will be described.

Figure 4:
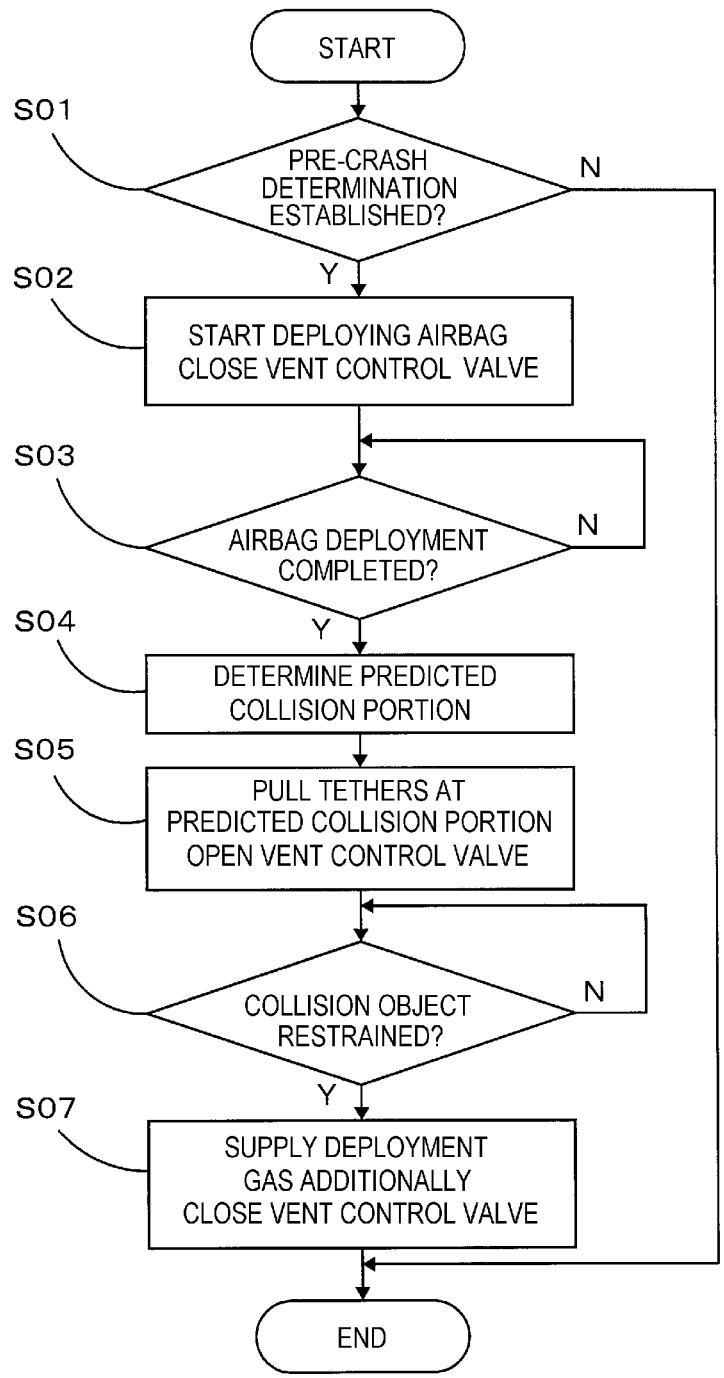
FIG. 4 is a flowchart of an operation of the airbag apparatus according to the embodiment in the event of a collision.

FIG. 4 is a flowchart of an operation of the airbag apparatus according to the embodiment in the event of a collision.

The operation will now be described step by step.

Step S01: Pre-Crash Determination

Using known pre-crash determination logic, the environment recognition unit 120 estimates a probability of occurrence of a collision between the vehicle 1 and a collision object such as a pedestrian and a bicyclist approaching from ahead of the vehicle 1, and determines whether the estimated probability is equal to or higher than a preset threshold.

When the probability of occurrence of the collision is equal to or higher than the threshold, the environment recognition unit 120 regards the collision as unavoidable and establishes a pre-crash determination. Then, the process proceeds to step S02. Otherwise, the process ends.

Step S02: Start of Airbag Deployment and Closing of Vent Control Valve

The airbag control unit 110 gives the inflator 111 a command to generate deployment gas and introduce the gas to the airbag 30 so as to start deploying the airbag 30.

At this time, to quicken the deployment of the airbag 30, the airbag control unit 110 switches the vent control valve 112 to a closed state.

Then, the process proceeds to step S03.

Step S03: Airbag Deployment Completion Determination

Based on an output from the pressure sensor 114, for example, the airbag control unit 110 determines whether the airbag 30 has been deployed to a predetermined volume.

When the airbag control unit 110 determines that the airbag 30 has been deployed to the predetermined volume, the airbag control unit 110 regards the deployment of the airbag 30 as completed, and the process proceeds to step S04, and otherwise repeats step S03.

Step S04: Predicted Collision Portion Determination

Based on outputs from various sensors such as the stereo camera device 121, the environment recognition unit 120 determines a portion (predicted collision portion) on the front surface of the airbag 30 with which the collision object such as a pedestrian is predicted to collide.

Then, the environment recognition unit 120 transmits information concerning the predicted collision portion to the airbag control unit 110, and the process proceeds to step S05.

Step S05: Pulling of Tethers at Predicted Collision Portion and Opening of Vent Control Valve The airbag control unit 110 gives the tether pulling device 113 a command to wind up the tethers 40 coupled to the predicted collision portion and its vicinity on the front surface of the airbag 30 so as to pull the front surface of the airbag 30 rearward of the vehicle.

At this time, the airbag control unit 110 switches the vent control valve 112 to an opened state so that the internal pressure of the airbag 30 is prevented from becoming excessively high owing to pulling of the front surface of the airbag 30.

Then, the process proceeds to step S06.

Step S06: Collision Object Restraint Determination

At step S05, a recessed portion is formed in the front surface of the airbag 30 by pulling the tethers 40. The airbag control unit 110 determines whether the collision object such as a pedestrian has entered and been held and restrained in the recessed portion.

A determination as to whether the collision object has been restrained may be made, for example, based on a history of internal pressures of the airbag 30 that have been detected by the pressure sensor 114 and a monitoring result of a position of the collision object by the stereo camera device 121.

When the airbag control unit 110 determines that the collision object has entered the airbag 30 to a predetermined depth and been restrained, the process proceeds to step S07, and otherwise repeats step S06.

Step S07: Additional Supply of Deployment Gas and Closing of Vent Control Valve

The airbag control unit 110 gives the inflator 111 a command to additionally supply the deployment gas to the airbag 30.

Also, the airbag control unit 110 switches the vent control valve 112 to a closed state.

Then, the process ends.

A description will now be made on state changes, functions, and effects of the airbag apparatus according to the embodiment during a collision with a pedestrian.

First, when a pre-crash determination with a pedestrian P or the like is established, the airbag 30 is deployed to a state illustrated in FIG. 2.

In this state, each of the tethers 40 has a preset initial length and is not pulled by the tether pulling device 113.

As a result, the front surface of the airbag 30 that is opposed to the pedestrian P or the like is moderately curved and convex forward of the vehicle.

After the deployment of the airbag 30 is completed, a predicted collision portion with which a collision object (such as the pedestrian P) is to collide is determined, and the tethers 40 coupled to the predicted collision portion and its vicinity are pulled by the tether pulling device 113.

Figure 5:
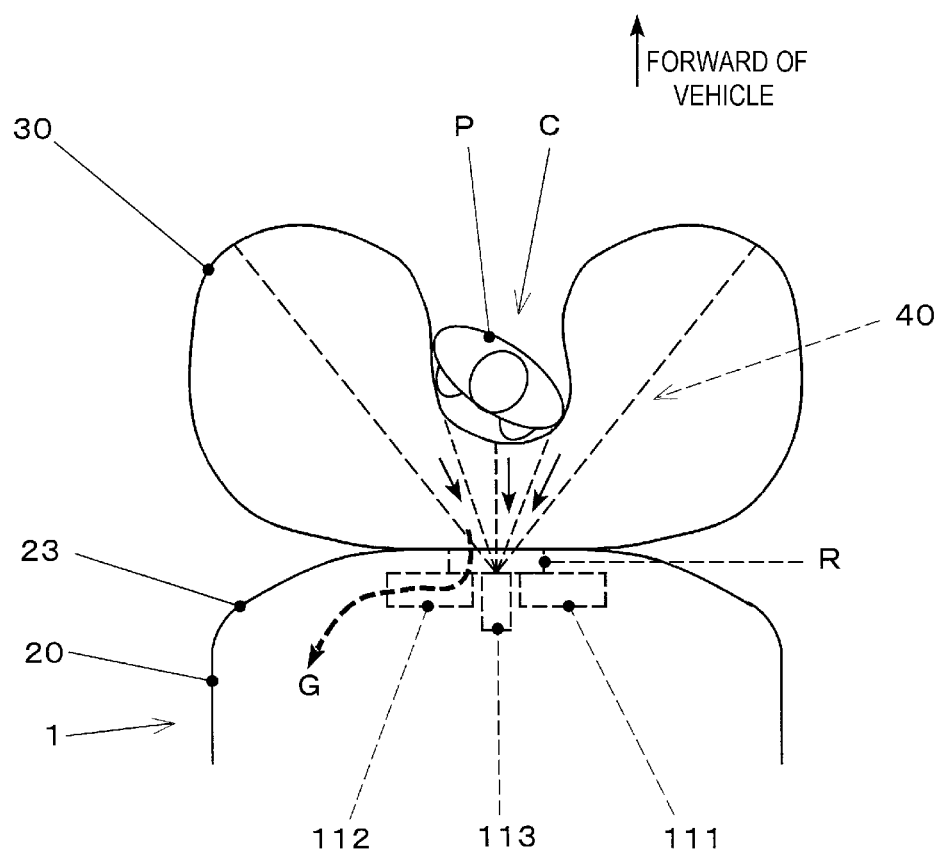
FIG. 5 is a diagram schematically illustrating a state after a vehicle including the airbag apparatus according to the embodiment has collided with a pedestrian.

FIG. 5 is a diagram schematically illustrating a state after a vehicle including the airbag apparatus according to the embodiment has collided with a pedestrian.

In an example illustrated in FIG. 5, the pedestrian P is colliding with a center portion of the front surface of the airbag 30 in the vehicle width direction.

At this time, of the five tethers 40 disposed in a horizontal direction, the tether pulling device 113 pulls a central one of the tethers 40 and each adjacent one on each side of the central one.

Thus, the recessed portion C to sustain the pedestrian P is formed in the front surface of the airbag 30.

FIG. 5 illustrates a state of the pedestrian P having entered the recessed portion C.

When the pedestrian P enters the recessed portion C to the predetermined depth, restraint of the pedestrian P is regarded as completed, and the airbag control unit 110 switches the vent control valve 112 to a closed state and causes the inflator 111 to supply the deployment gas G additionally.

Figure 6:
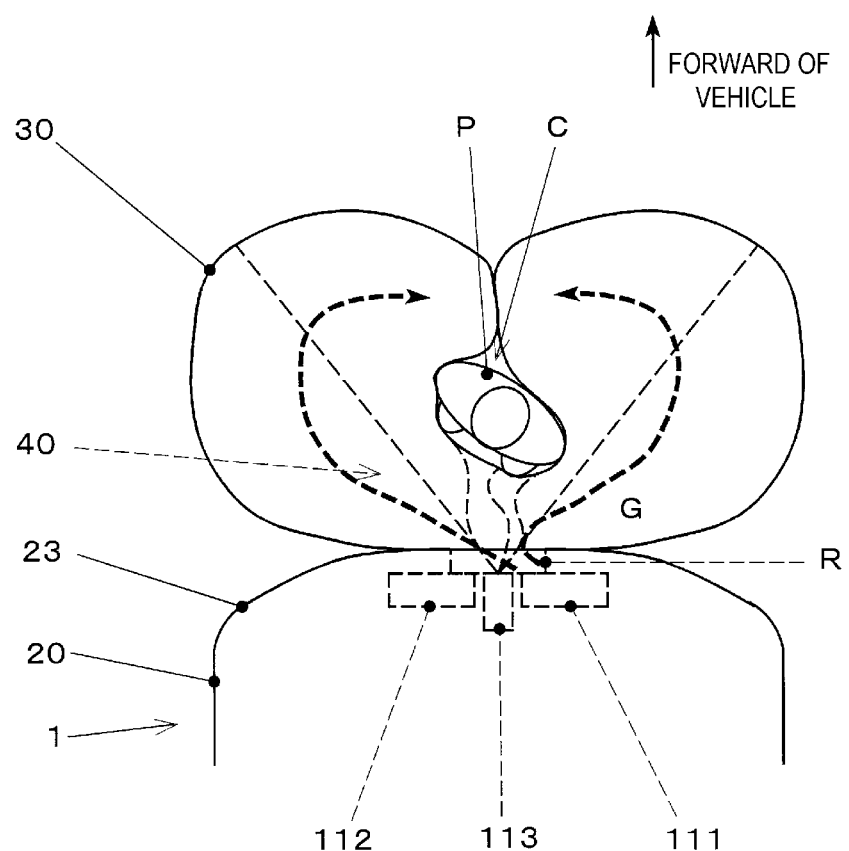
FIG. 6 is a diagram illustrating a state when the vehicle including the airbag apparatus according to the embodiment that has collided with the pedestrian completes restraint of the pedestrian by the airbag.

FIG. 6 is a diagram illustrating a state when the vehicle including the airbag apparatus according to the embodiment that has collided with the pedestrian completes restraint of the pedestrian by the airbag.

In this state, the internal pressure of the airbag 30 is increased so that the airbag 30 presses, holds, and restrains the pedestrian P in the recessed portion C.

As has been described heretofore, this embodiment can produce the following effects.

1. The recessed portion C is formed by pulling the collision portion or its vicinity on the front surface of the airbag 30 rearward of the vehicle. Consequently, while the collision object such as the pedestrian P is restrained in the recessed portion C, the airbag 30 can be contracted to stably absorb energy, and the pedestrian P or the like can be pressed and accelerated forward of the vehicle so as to decrease relative speed of the pedestrian P or the like and the vehicle body, thereby preventing injury to the pedestrian P or the like.

Moreover, restraint of the pedestrian P or the like in the recessed portion C can prevent the pedestrian P or the like from being thrown forward of the vehicle by a reaction force received from the airbag 30.

2. The tether pulling device 113 selectively pulls the tethers 40 coupled to the predicted collision portion and its adjacent area on the front surface of the airbag 30. Therefore, even when the collision position of the pedestrian P or the like on the front surface of the airbag 30 varies, the above-described effects can be obtained in a wide range of the front surface of the airbag 30.

3. When the tether pulling device 113 pulls the tethers 40, the vent control valve 112 is switched to an opened state. Consequently, when the airbag 30 is reduced in volume, the internal pressure of the airbag 30 can be prevented from increasing excessively so as to form the recessed portion C quickly.

4. After the pedestrian P or the like is restrained in the recessed portion C of the airbag 30, the vent control valve 112 is switched to a closed state so that the internal pressure of the airbag 30 can be prevented from decreasing, thereby enhancing restraint force of the pedestrian P or the like.

5. After the pedestrian P or the like is restrained in the recessed portion C of the airbag 30, the inflator 111 additionally supplies the deployment gas G so that the internal pressure of the airbag 30 can be increased to strengthen the restraint force, thereby promoting the above-described effects.

Modifications

The disclosure is not to be limited to the above-described embodiment but may be modified in various manners. Such modifications will also fall within the technical scope of the disclosure.

1. The configurations of the airbag apparatus and the vehicle are not to be limited to those of the above-described embodiment but may be modified as suited.

For example, a configuration, shape, material, manufacturing method, location, and the number of each kind of components that constitute the airbag apparatus and the vehicle, and details of various kinds of control are not to be limited to those of the embodiment but may be modified as suited.

2. A method of performing a pre-crash determination and a method of discriminating a collision form are not to be limited to those in the above-described embodiment but may be modified as suited.

3. The number and location of the tethers disposed in the airbag, and a configuration of the tether pulling device, for example, are not to be limited to those of the above-described embodiment but may be modified as suited.

For example, in the embodiment, the five tethers are radially disposed in a horizontal plane. However, the tethers are not to be limited to radial disposition but may be disposed in parallel or other disposition. The number of the tethers may be increased or decreased as suited.

The plurality of tethers may be distributed vertically.

The airbag apparatus according to the embodiment of the disclosure includes the airbag, the collision determiner, the airbag deployment controller, and the pulling device. The airbag is configured to be deployed forward of the vehicle body front of the vehicle. The collision determiner is configured to establish a pre-crash determination when a collision probability is equal to or higher than the predetermined threshold. The airbag deployment controller is configured to give the inflator a command to supply deployment gas to the airbag and deploy the airbag, in response to the pre-crash determination. The pulling device is configured to pull, rearward of the vehicle, a collision portion with which a collision object is to collide or vicinity of the collision portion on the front surface of the airbag so as to form the recessed portion configured to restrain the collision object.

With this configuration, the recessed portion is formed by pulling the collision portion or its vicinity on the front surface of the airbag rearward of the vehicle. Consequently, while the collision object such as the pedestrian is restrained in the recessed portion, the airbag can be contracted to stably absorb energy, and the collision object can be pressed and accelerated forward of the vehicle so as to decrease relative speed of the collision object and the vehicle body, thereby preventing injury to the collision object.

Moreover, restraint of the collision object in the recessed portion can prevent the collision object from being thrown forward of the vehicle by a reaction force received from the airbag.

In the embodiment of the disclosure, the airbag apparatus may further include the collision portion estimator configured to estimate the collision portion of the airbag with which the collision object is to collide. The pulling device may be configured to selectively pull one or more of a plurality of portions distributed on the front surface of the airbag, in accordance with an estimation of the collision portion.

With this configuration, even when the collision position of the object on the front surface of the airbag varies, the above-described effects can be obtained in a wide range of the front surface of the airbag.

In the embodiment of the disclosure, the airbag apparatus may further include the vent controller configured to control opening and closing of the vent passage configured to discharge the deployment gas from the airbag. The vent controller may be configured to switch the vent passage to an opened state when the pulling device pulls the front surface.

With this configuration, when the airbag is reduced in volume by pulling the front surface, the internal pressure of the airbag can be prevented from increasing excessively so as to form the recessed portion quickly.

When the collision object collides with the airbag, the airbag is contracted while the deployment gas is discharged via the vent passage so that energy absorption can be effectively performed.

In this case, the vent controller may be configured to switch the vent passage to a closed state after the collision object is restrained in the recessed portion.

With this configuration, after the collision object is restrained in the recessed portion, the vent passage is switched to a closed state so that the internal pressure of the airbag can be prevented from decreasing, thereby enhancing restraint force of the collision object.

In the embodiment of the disclosure, after the collision object is restrained in the recessed portion, the inflator may be configured to additionally supply the deployment gas to the airbag.

With this configuration, after the collision object is restrained in the recessed portion, the internal pressure of the airbag can be increased to strengthen the restraint force, thereby promoting the above-described effects.

As has been described heretofore, according to the embodiment of the disclosure, it is possible to provide the airbag apparatus that can prevent injury to a pedestrian or the like.

The airbag control unit 110 and the environment recognition unit 120 illustrated in FIG. 3 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the airbag control unit 110 and the environment recognition unit 120 illustrated in FIG. 3. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the airbag control unit 110 and the environment recognition unit 120 illustrated in FIG. 3.

The invention claimed is:

1. An airbag apparatus to be applied to a vehicle, the airbag apparatus comprising:
   an airbag configured to be deployed forward of a vehicle body front of the vehicle;
   a collision determiner configured to establish a pre-crash determination in a case where a collision probability is equal to or higher than a predetermined threshold;
   an airbag deployment controller configured to, in response to the pre-crash determination, give to an inflator a command to supply deployment gas to the airbag and deploy the airbag; and
   a pulling device configured to rearwardly pull, in response to a determination that deployment of the airbag is completed, a front surface of the airbag that is:
      a collision portion with which a collision object is to collide so as to form a recessed portion that is recessed rearward of the vehicle and restrains the collision object; or
      in a vicinity of the collision portion so as to form the recessed portion that is recessed rearward of the vehicle and restrains the collision object.

2. The airbag apparatus according to claim 1, further comprising a collision portion estimator configured to make an estimation on the collision portion of the airbag with which the collision object is to collide,
   wherein the pulling device is configured to selectively pull one or more of a plurality of portions distributed on the front surface of the airbag, in accordance with the estimation on the collision portion.

3. The airbag apparatus according to claim 1, further comprising a vent controller configured to control opening and closing of a vent passage configured to discharge the deployment gas from the airbag,
   wherein the vent controller is configured to switch the vent passage to an opened state in a case where the pulling device pulls the front surface.

4. The airbag apparatus according to claim 2, further comprising a vent controller configured to control opening and closing of a vent passage configured to discharge the deployment gas from the airbag,
   wherein the vent controller is configured to switch the vent passage to an opened state in a case where the pulling device pulls the front surface.

5. The airbag apparatus according to claim 3, wherein the vent controller is configured to switch the vent passage to a closed state after the collision object is restrained in the recessed portion.

6. The airbag apparatus according to claim 4, wherein the vent controller is configured to switch the vent passage to a closed state after the collision object is restrained in the recessed portion.

7. The airbag apparatus according to claim 1, wherein after the collision object is restrained in the recessed portion, the inflator is configured to additionally supply the deployment gas to the airbag.

8. The airbag apparatus according to claim 2, wherein after the collision object is restrained in the recessed portion, the inflator is configured to additionally supply the deployment gas to the airbag.

9. The airbag apparatus according to claim 3, wherein after the collision object is restrained in the recessed portion, the inflator is configured to additionally supply the deployment gas to the airbag.

10. The airbag apparatus according to claim 4, wherein after the collision object is restrained in the recessed portion, the inflator is configured to additionally supply the deployment gas to the airbag.

11. The airbag apparatus according to claim 5, wherein after the collision object is restrained in the recessed portion, the inflator is configured to additionally supply the deployment gas to the airbag.

12. The airbag apparatus according to claim 6, wherein after the collision object is restrained in the recessed portion, the inflator is configured to additionally supply the deployment gas to the airbag.

13. An airbag apparatus to be applied to a vehicle, the airbag apparatus comprising:
   an airbag configured to be deployed forward of a vehicle body front of the vehicle; circuitry configured to:
      establish a pre-crash determination in a case where a collision probability is equal to or higher than a predetermined threshold; and
      upon establishing the pre-crash determination, give to an inflator a command to supply deployment gas to the airbag and deploy the airbag; and
   a pulling device configured to rearwardly pull, in response to a determination that deployment of the airbag is completed, a front surface of the airbag that is:
      a collision portion with which a collision object is to collide so as to form a recessed portion that is recessed rearward of the vehicle and restrains the collision object; or
      in a vicinity of the collision portion so as to form the recessed portion that is recessed rearward of the vehicle and restrains the collision object.

14. The airbag apparatus according to claim 1, wherein the airbag is deployed forward of the vehicle from a center portion of the vehicle body front of the vehicle body in the vehicle width direction.

15. The airbag apparatus according to claim 1, wherein the recessed portion is formed such that the collision object is held by the airbag with the airbag surrounding the collision object.

16. The airbag apparatus according to claim 1, wherein the recessed portion is formed such that the airbag is positioned between the collision object and the vehicle body front of the vehicle, and
   wherein the recessed portion is formed such that the airbag is positioned forward of collision object.

17. The airbag apparatus according to claim 1, wherein the recessed portion is formed so as to enclose the recessed portion around the collision object to prevent the collision object from being thrown forward of the vehicle.

* * * * *